US012673406B2

(12) United States Patent
Solf et al.

(10) Patent No.: US 12,673,406 B2
(45) Date of Patent: Jul. 7, 2026

(54) HANDHELD WORK APPARATUS

(71) Applicant: Andreas Stihl AG & Co. KG, Waiblingen (DE)

(72) Inventors: Lukas Solf, Reichenbach (DE); Max Dopatka, Holzmaden (DE); David Vorsmann, Balve (DE); Marc Olivan, Stuttgart (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 0 days.

(21) Appl. No.: 18/604,143

(22) Filed: Mar. 13, 2024

(65) Prior Publication Data

US 2024/0308048 A1 Sep. 19, 2024

(30) Foreign Application Priority Data

Mar. 14, 2023 (DE) ..................... 10 2023 106 397.9

(51) Int. Cl.
*B25F 5/00* (2006.01)

(52) U.S. Cl.
CPC .................................... *B25F 5/008* (2013.01)

(58) Field of Classification Search
CPC ....................................................... B25F 5/008
See application file for complete search history.

(56) References Cited

U.S. PATENT DOCUMENTS

| | | | |
|---|---|---|---|
| 5,099,160 | A | 3/1992 | Stroezel et al. |
| 9,537,370 | B2 * | 1/2017 | Hess ......................... B25F 5/02 |
| 2007/0266966 | A1 | 11/2007 | Ohsawa et al. |
| 2009/0218113 | A1 | 9/2009 | Johnen et al. |
| 2018/0326337 | A1 * | 11/2018 | Esenwein .......... B01D 46/0005 |
| 2020/0276694 | A1 * | 9/2020 | Esenwein ............... B25F 5/008 |
| 2020/0338780 | A1 | 10/2020 | Watanabe et al. |
| 2022/0288762 | A1 | 9/2022 | Ito et al. |
| 2022/0314422 | A1 | 10/2022 | Karlsson et al. |
| 2023/0090978 | A1 | 3/2023 | Arnell et al. |
| 2023/0099820 | A1 | 3/2023 | Kachi et al. |

FOREIGN PATENT DOCUMENTS

| | | | |
|---|---|---|---|
| DE | 963 637 | C | 5/1957 |
| DE | 1 954 476 | U | 2/1967 |
| DE | 38 24 234 | A1 | 1/1990 |
| DE | 203 04 324 | U1 | 7/2003 |
| DE | 10 2007 024 213 | A1 | 1/2008 |
| DE | 10 2015 224 791 | A1 | 2/2017 |

(Continued)

*Primary Examiner* — Daniel Jeremy Leeds

(74) *Attorney, Agent, or Firm* — Walter Ottesen, P.A.

(57) ABSTRACT

A handheld work apparatus includes a cooling air channel formed in the housing for guiding a cooling air flow, and at least one cooling air grid, the at least one cooling air grid being arranged at the channel inlet and/or the channel outlet. The housing includes a bearing structure. The bearing structure is a separate component in relation to the at least one cooling air grid. A support arrangement arranged between the cooling air grid and the bearing structure is provided in the cooling air channel. The cooling air grid and the support arrangement are configured and arranged with respect to each other in such a way that a force acting on the cooling air grid can be transmitted from the cooling air grid via the support arrangement to the bearing structure.

14 Claims, 9 Drawing Sheets

(56) References Cited

FOREIGN PATENT DOCUMENTS

| | | | |
|---|---|---|---|
| DE | 10 2015 225 748 | A1 | 6/2017 |
| DE | 10 2020 002 073 | A1 | 10/2020 |
| DE | 10 2022 000 651 | A1 | 9/2022 |
| DE | 10 2022 003 349 | A1 | 3/2023 |
| EP | 2 095 910 | A1 | 9/2009 |
| EP | 2 429 065 | A2 | 3/2012 |
| WO | 2021/254174 | A1 | 12/2021 |

* cited by examiner

HANDHELD WORK APPARATUS

CROSS-REFERENCE TO RELATED APPLICATIONS

This application claims priority of German patent application no. 10 2023 106 397.9, filed Mar. 14, 2023, the entire content of which is incorporated herein by reference.

BACKGROUND

Handheld work apparatuses which include a housing and a drive motor arranged in the housing are known. A tool of the work apparatus is driven via the drive motor. To cool the drive motor, such a work apparatus typically includes a cooling air channel. A cooling air flow flows along the cooling air channel and flows through the drive motor in order to cool it.

The channel inlet and channel outlet of the cooling air channel of the work apparatus are each provided with a cooling air grid. Such cooling air grids have a large number of grid ribs spaced apart from one another. Between the individual grid ribs, air can flow into the cooling air channel or out of the cooling air channel. A cooling air grid is part of the housing of the work apparatus and has a low load capacity compared to the rest of the housing structure.

SUMMARY

It is an object of the disclosure to specify a work apparatus that has an increased load capacity of the cooling air grid while retaining the functionality in respect of the inflow or discharge of air.

This object is, for example, achieved by a handheld work apparatus including: a housing; a drive motor arranged in the housing and configured to drive a tool of the work apparatus; a cooling air channel formed in the housing for guiding a cooling air flow; the cooling air channel having at least one channel inlet and at least one channel outlet; at least one cooling air grid arranged at least at one of the channel inlet and the channel outlet; the housing having a bearing structure; the bearing structure being a separate component in relation to the at least one cooling air grid; a support arrangement arranged between the cooling air grid and the bearing structure being provided in the cooling air channel; and, the cooling air grid and the support arrangement being configured and arranged with respect to each other such that a force acting on the cooling air grid is transmittable from the cooling air grid via the support arrangement to the bearing structure.

The handheld work apparatus according to the disclosure includes a housing and a drive motor arranged in the housing, the drive motor being provided for driving a tool of the work apparatus, a cooling air channel formed in the housing for guiding a cooling air flow, the cooling air channel having at least one channel inlet and at least one channel outlet, at least one cooling air grid, the at least one cooling air grid being arranged at the channel inlet and/or the channel outlet, wherein the housing includes a bearing structure, the bearing structure being in the form of a separate component in relation to the at least one cooling air grid, and wherein a support arrangement arranged between the cooling air grid and the bearing structure is provided in the cooling air channel, the cooling air grid and the support arrangement being configured and arranged with respect to each other in such a way that a force acting on the cooling air grid can be transmitted from the cooling air grid via the support arrangement to the bearing structure.

If the handheld work apparatus is set down, for example, on a non-level surface, an external force can act on the cooling air grid. To avoid damage to the cooling air grid, the cooling air grid is protected by the support arrangement against excessive deformation. The force acting on the cooling air grid is first transmitted to the support arrangement. The force is subsequently further transmitted from the support arrangement to the bearing structure, which is part of the housing. Thus, the external load acting on the cooling air grid is transmitted to the rest of the housing before damage to the cooling air grid occurs.

It is advantageously provided that the cooling air grid and the support arrangement are configured and arranged with respect to each other in such a way that, during the transmission of the force, which causes the cooling air grid to deform until the cooling air grid bears against the support arrangement, the cooling air grid is merely elastically deformed. If the force no longer acts on the cooling air grid, the cooling air grid deforms back into its original shape. The support arrangement dissipates the force acting on the cooling air grid into the housing before plastic deformation or elongation at break of the cooling air grid occurs.

It is advantageously provided that the support arrangement is at least partially fixedly connected to the bearing structure. Particularly advantageously, the support arrangement is at least partially formed in one piece with the bearing structure. In an alternative embodiment of the work apparatus, it may also be provided that the support arrangement is formed separately from the bearing structure and is fixedly connected to the cooling air grid, in particular is formed in one piece.

Advantageously, the support arrangement is in the form of a separate component with respect to the cooling air grid. Particularly preferably, the support arrangement is movable relative to the cooling air grid. Particularly preferably, a relative movement between the support arrangement and the cooling air grid is possible. Thus, an action of shearing forces on the support arrangement is avoided. Thus, essentially compressive forces act on the support arrangement when force is correspondingly admitted to the cooling air grid. Bending forces can also act on the support arrangement to a small extent.

It is advantageously provided that the support arrangement and the cooling air grid are spaced apart from each other in the unloaded state of the cooling air grid. The distance between the support arrangement and the cooling air grid is not more than 3 mm. If the force Facts on the cooling air grid, the distance between the cooling air grid and the support arrangement permits elastic deformation of the cooling air grid before they make contact with each other. The energy can be partially dissipated by the elastic deformation of the cooling air grid; in some cases, it can already be introduced into the housing only via the cooling air grid. The energy then still remaining can then be introduced into the housing via the support arrangement when there is contact between the cooling air grid and the support arrangement. This ensures a gradual dissipation of energy and a gradual distribution of energy into the housing of the work apparatus. Such an energy distribution is particularly gentle on the housing.

It is preferably provided that the support arrangement is formed from at least one rib-like support wall, the support wall having a contact surface via which the force acting on the cooling air grid can be transmitted directly from the cooling air grid to the support wall. The contact surface is configured such that the contact surface between the cooling air grid and the support wall is as large as possible in order to ensure a uniform transmission of force to the support wall. The cooling air grid has a plurality of grid ribs, wherein the contact surface of the support wall extends transversely to the grid ribs via a plurality of grid ribs. The grid ribs and the contact surface enclose an angle between 45° and 90°, preferably between 80° and 90°. This means that the force is transmitted to the support wall via all of the grid ribs. The support wall is configured in such a way that the distances between the contact surface of the support wall and the individual grid ribs are substantially identical in size. The aim is therefore to ensure that a force can be uniformly transmitted by the grid ribs to the support wall.

Particularly preferably, it is provided that the support wall is arranged in the cooling air channel in such a way that the direction of a longitudinal center axis of the support wall substantially corresponds to the flow direction of the cooling air flow. The flow resistance of the support wall is therefore low. The influence of the support wall on the volumetric flow rate of the cooling air flow is small.

BRIEF DESCRIPTION OF DRAWINGS

The invention will now be described with reference to the drawings wherein.

DETAILED DESCRIPTION

Figure 1:
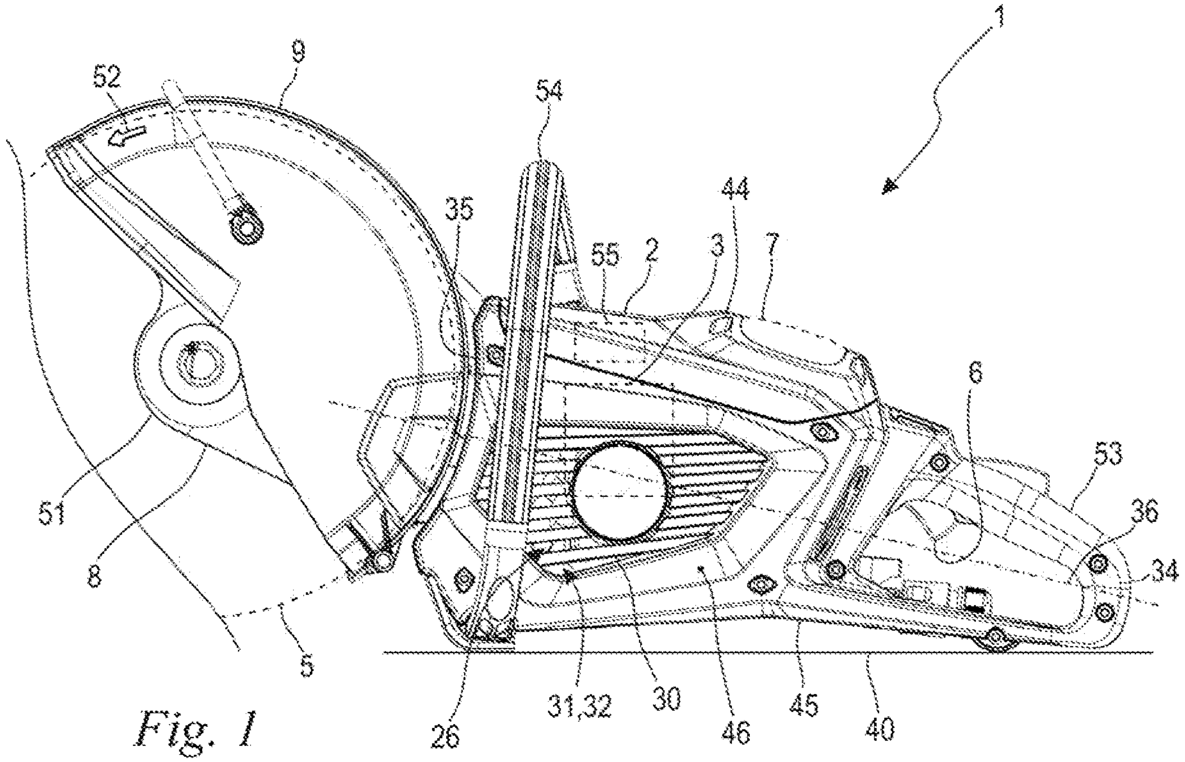
FIG. 1 shows, in a side view, an embodiment according to the disclosure of the electrical work apparatus as a cut-off machine.

FIG. 1 shows a cut-off machine as an embodiment for a handheld work apparatus 1 according to the disclosure. The work apparatus 1 is a handheld, in particular portable work apparatus 1. The work apparatus 1 is carried and guided by the operator during operation. The work apparatus 1 has a housing 2 on which a handle 53 and a bale handle 54 are arranged for guiding the work apparatus 1 during operation. Other handles may also be provided. A drive motor 3 is arranged in the housing 2. The drive motor 3 is illustrated merely schematically by a dashed rectangle. An operator controlled element 6 for activating the drive motor 3 is provided on the rear handle 53. In the embodiment, the drive motor 3 is an electric motor. The electric motor is supplied with power by a battery 7 held in the housing 2. In an alternative embodiment, the drive motor 3 may also be in the form of an internal combustion engine. The work apparatus 1 includes an outrigger 8 which is fixed at its one end to the housing 2. The outrigger 8 has a free end 51 that protrudes away from the housing 2. A tool 5 is mounted rotatably at the free end 51 of the outrigger 8. The tool 5 is merely schematically indicated. In the embodiment, the tool 5 is a cutting disk. During operation of the work apparatus 1, the tool 5 is rotationally driven by the drive motor 3 in a rotational direction 52. A protective hood 9 is fixed on the outrigger 8. The protective hood 9 covers the tool 5 over a part of its circumference.

Figure 2:
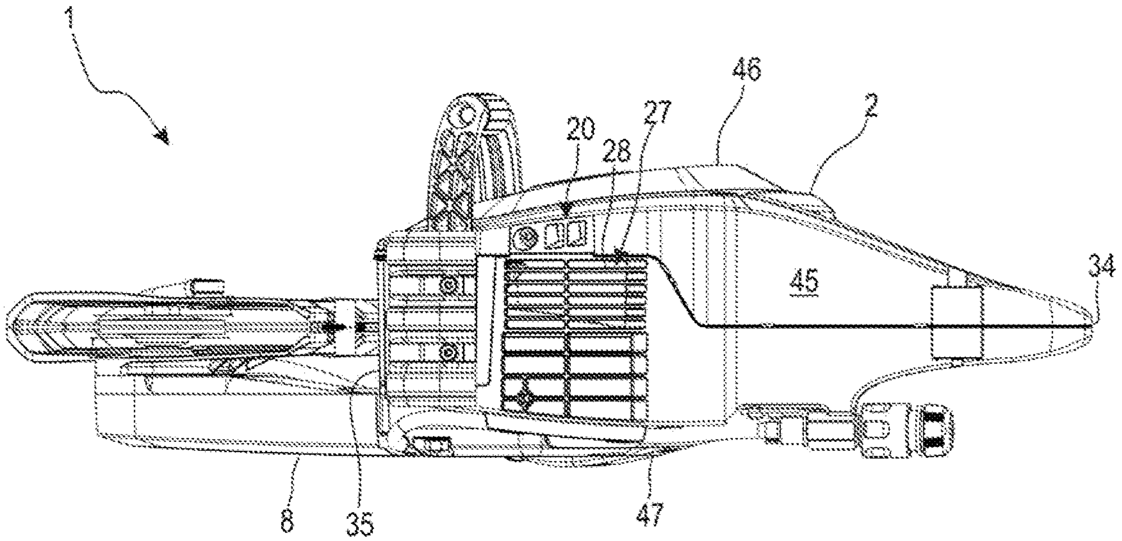
FIG. 2 shows, in a view from below, the work apparatus according to FIG. 1.

As shown in FIGS. 1 and 2, the housing 2 extends along a longitudinal center axis 36 from a rear end 34 to a front end 35. The rear end 34 of the housing 2 is formed on the handle 53. Beyond the front end 35 of the housing 2, the outrigger 8 extends with the tool 5 arranged on the outrigger 8. Furthermore, the housing 2 includes a top side 44 and a bottom side 45, wherein the work apparatus 1 can be set down on the bottom side 45 onto the ground 40. The top side 44 and the bottom side 45 are connected to each other by a first longitudinal side 46 and a second longitudinal side 47.

In the preferred embodiment, the work apparatus 1 includes a control unit 55 arranged in the housing 2. The control unit 55 is shown schematically in FIG. 1 by a dashed rectangle. The control unit 55 processes signals generated by operator controlled elements 6 and is essentially used to control the drive motor 3.

Figure 3:
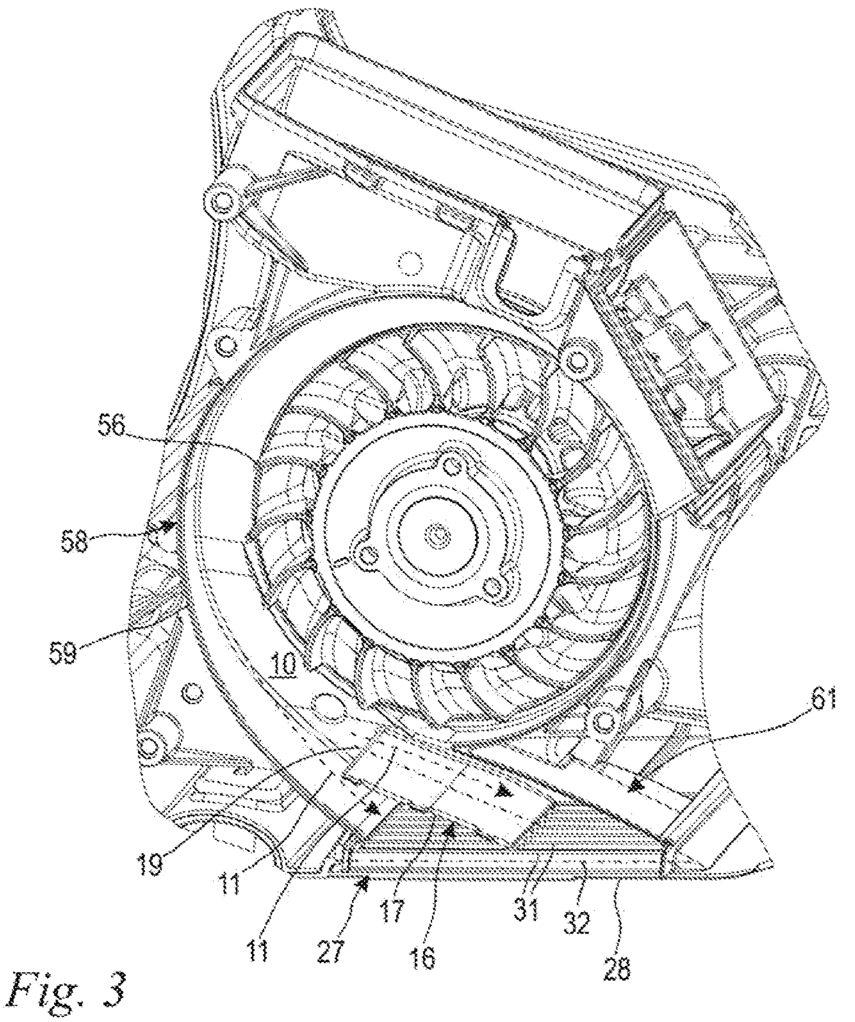
FIG. 3 shows, in a partial, perspective illustration, an end portion of the cooling air channel in the spiral housing of the work apparatus according to FIG. 1.

The work apparatus 1 includes at least one cooling air channel 10 for guiding a cooling air flow 11 (FIG. 3). Via the cooling air flow 11, the drive motor 3, which is in the form of an electric motor, is cooled during operation of the work apparatus 1. In addition, further components, in particular electronic components, of the work apparatus 1 are to be cooled. Such electronic components include, for example, the control unit 55 or the battery 7.

As shown in FIGS. 1 and 2, a channel inlet 26 and a channel outlet 27 are provided in the housing 2. The cooling air flow 11 flows into the cooling air channel 10 via the channel inlet 26. The cooling air flow 11 then flows through the cooling air channel 10 and, in the process, cools the control unit 55, the battery 7 and the drive motor 3. Finally, the cooling air flow 11 flows out of the cooling air channel 10 into the environment via the channel outlet 27. In the embodiment, the channel inlet 26 is arranged on the first longitudinal side 46 of the housing 2. The channel inlet 26 is formed by a first ventilation grid 30 of the housing 2. As shown in FIG. 2, in the preferred embodiment, the channel outlet 27 is formed on the bottom side 45 of the housing 2. The channel outlet 27 is formed by a second ventilation grid 28 of the housing 2.

Figure 5:
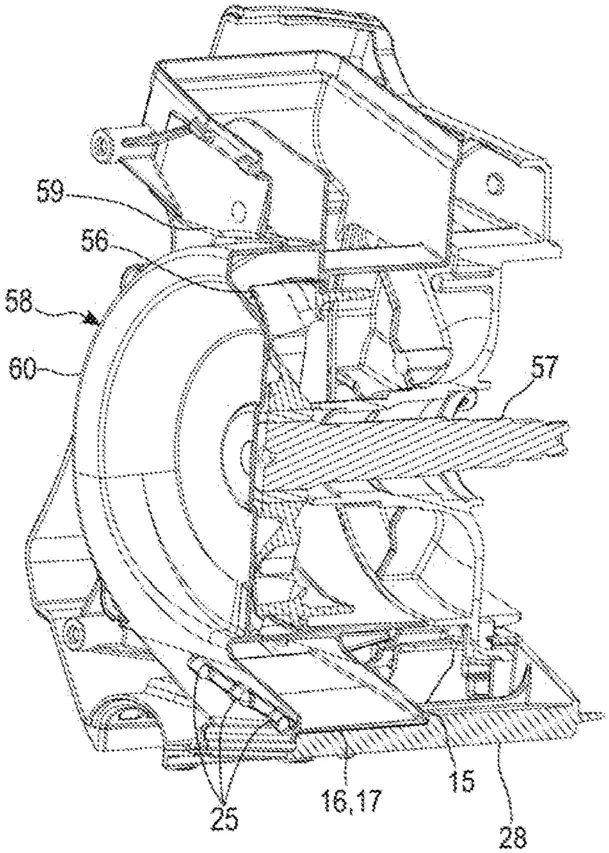
FIG. 5 shows, in a partial, perspective sectional illustration, the spiral housing with a support arrangement.
Figure 6:
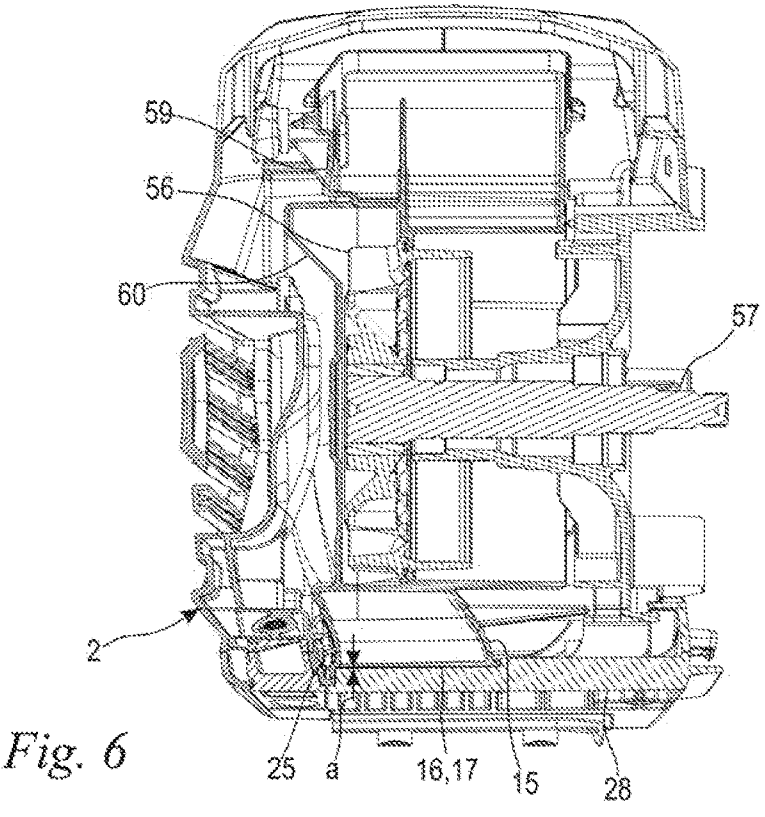
FIG. 6 shows, in a lateral sectional illustration, the spiral housing with a support arrangement.

FIG. 3 shows a perspective detail in which an end section of the cooling air channel 10 is shown. The work apparatus 1 includes a fan wheel 56 that is rotationally driven via the drive motor 3. The fan wheel 56 preferably sits on a drive shaft 57 of the drive motor 3 (FIGS. 5 and 6). The fan wheel 56 is arranged in a spiral housing 58. During operation of the work apparatus 1, the cooling air flow 11 is generated via the rotation of the fan wheel 56, the cooling air flow finally flowing out of the channel outlet 27 via a diffuser 61 of the spiral housing 58. The second cooling air grid 28 is arranged at the channel outlet 27.

Figure 4:
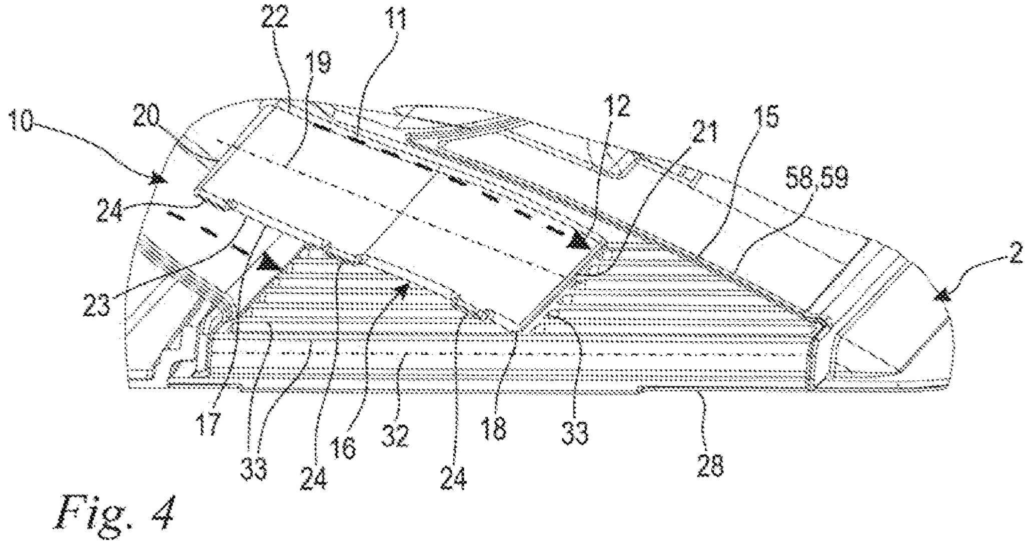
FIG. 4 shows, in a partial, perspective illustration, the support arrangement on the cooling air grid of the channel outlet.

FIG. 4 shows an enlarged detail from FIG. 3, in which a support arrangement 16 of the work apparatus 1 is shown. As shown in FIGS. 3 and 4, the support arrangement 16 is formed as a rib-like support wall 17. The rib-like support wall 17 is arranged in the cooling air channel 10, in particular in the region of the diffuser 61. The support wall 17 is arranged on the housing 2, in particular on the spiral housing 58. The spiral housing 58 includes a first part 59 and a second part 60 (FIG. 5). The support wall 17 is arranged, in particular formed, here on the first part 59 of the spiral housing 58. Particularly preferably, the support wall 17 is formed in one piece with the first part 59 of the spiral housing 58.

As shown in FIGS. 3 and 4, the cooling air grid 28 includes a plurality of grid ribs 31. The grid ribs 31 each extend along their longitudinal center axis 32. The grid ribs 31 are preferably oriented parallel to one another. A connecting web 33 extends transversely to the longitudinal center axes 32 of the grid ribs 31. The connecting web 33 connects the individual grid ribs 31 to one another.

As shown in FIGS. 3 and 4, the support wall 17 has a contact surface 18 facing the cooling air grid 28. The contact surface 18 extends almost completely over the width b of the cooling air grid 28. The support wall 17 is configured and arranged opposite the cooling air grid 28 in such a way that forces F (see FIG. 9) acting on the cooling air grid 28 can be transmitted from the cooling air grid 28 to the support wall 17. The contact between the cooling air grid 28 and the contact surface 18 of the support wall 17 results in the formation of a contact surface via which forces are transmitted. If the support wall 17 and the cooling air grid 28 are spaced apart from each other, the cooling air grid 28 is firstly elastically deformed until it comes to bear against the contact surface 18 of the support wall 17. Particularly preferably, upon contact between the cooling air grid 28, 30 and the support wall 17, the support wall 17 rests with its contact surface 18 on the connecting web 33. Via contact with the connecting web 33, a homogeneous force can be introduced to the cooling air grid 28.

As shown in FIGS. 3 and 4, the support arrangement 16, in particular the support wall 17, extends along its longitudinal center axis 19 from a first longitudinal end 20 to a second longitudinal end 21. The first longitudinal end 20 is arranged upstream of the second longitudinal end 21 with respect to the cooling air flow 11. Thus, the second longitudinal end 21 is closer to the cooling air grid 28 than the first longitudinal end 20 of the support arrangement 16. The contact surface 18 is formed at the second longitudinal end 20 of the support arrangement 16. The support arrangement 16, in particular the support wall 17, is arranged in the cooling air channel 10 in such a way that the direction of the longitudinal center axis 19 of the support arrangement 16 substantially corresponds to the flow direction 12 of the cooling air flow 11. Therefore, the support arrangement 16 has an inclined position in relation to the cooling air grid 28, 30. The longitudinal center axis 19 of the support arrangement 16 therefore intersects a contact plane which is stretched over the inner side 38 of the cooling air grid 28, 30, at an angle which is less than 90°, preferably less than 60°. The angle between the longitudinal center axis 19 and the contact plane is at least 39°, preferably approximately 45°. The support wall 17 is preferably flat. The support wall 17 has a first longitudinal side 22 and a second longitudinal side 23. In the present embodiment, the first longitudinal side 22 is fixedly connected to the spiral housing 58, in particular to the first part 59 of the spiral housing 58. Thus, the spiral housing 58, in particular the first part 59 of the spiral housing 58, forms at least part of the bearing structure 15.

In the embodiment, the second cooling air grid 28 is part of the handle housing of the work apparatus 1. The cooling air grid 28 is formed in one piece with the handle housing. The handle housing is in turn part of the housing 2. The cooling air grid 28 is preferably made of the material "PA6-GF30-1".

The function, the structure, possible embodiments and the interaction between the cooling air grid 28, 30, the support arrangement 16 and the housing 2 are described in more detail below by way of the schematic illustrations shown in FIGS. 7 to 9.

Figure 7:
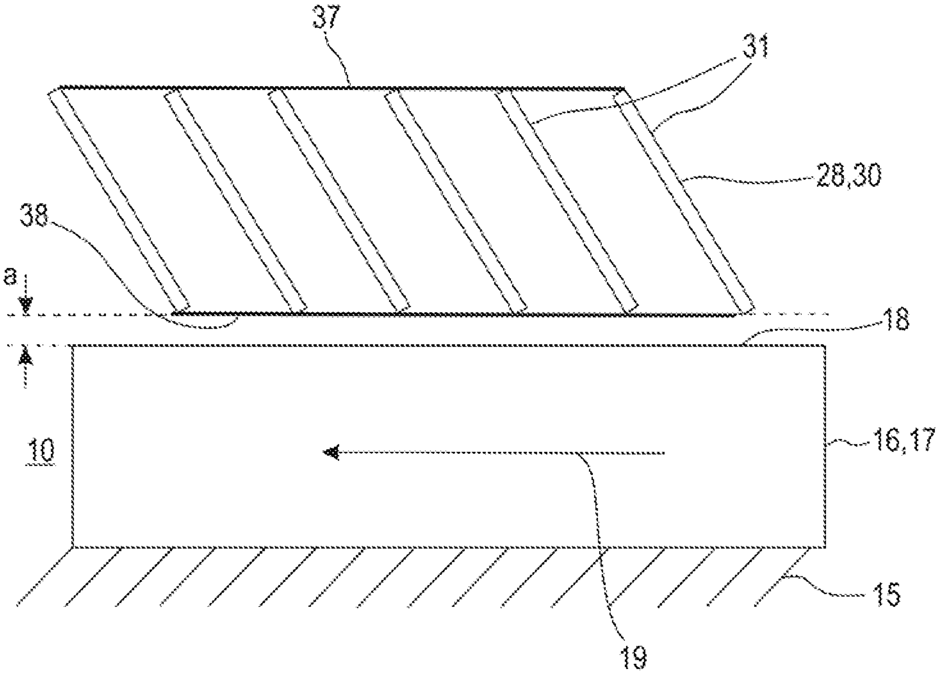
FIGS. 7 to 9 show, in schematic views, the arrangement including the support arrangement, cooling air grid and bearing structure.
Figure 8:
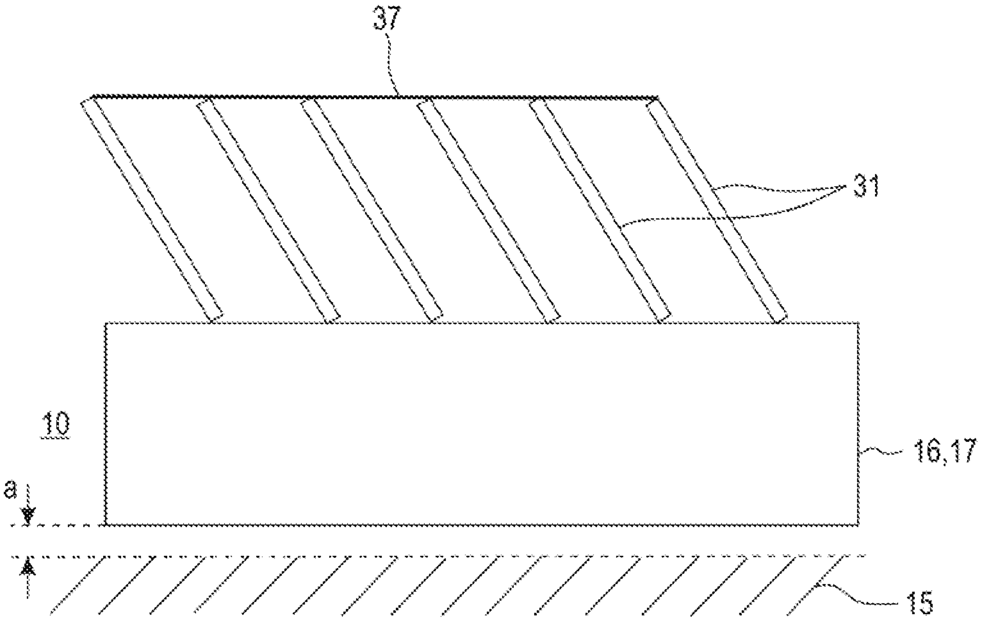
Figure 9:
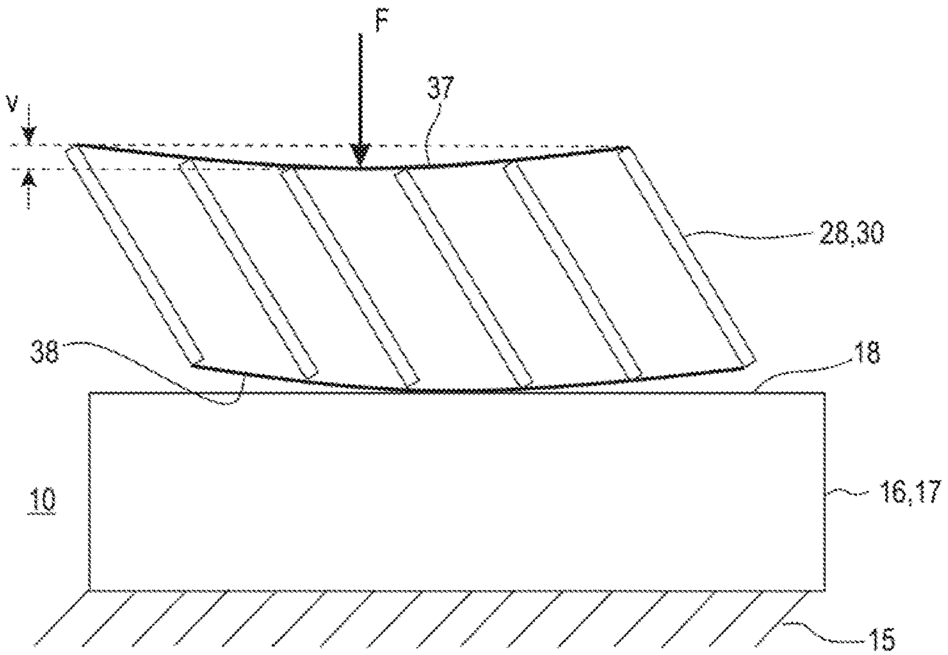
Figure 10:
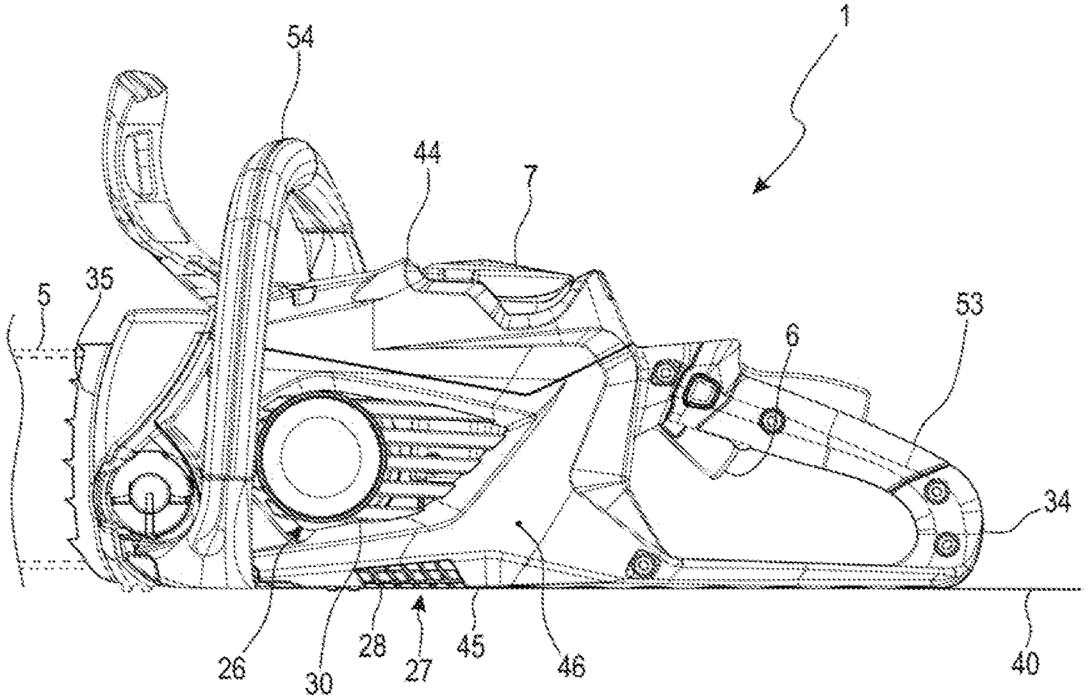
FIG. 10 shows, in a side view, a further embodiment according to the disclosure of the electrical work apparatus as a chain saw.

As shown in FIGS. 7 to 9, the support arrangement 16, which is configured in particular as a ribbed support wall 17, is arranged in the cooling air channel 10 between the cooling air grid 28, 30 and the bearing structure 15. In this case, the cooling air grid 28, 30 and the support arrangement 16 are configured and arranged with respect to each other in such a way that a force F (FIG. 9) acting on the cooling air grid 28, 30 can be transmitted by the cooling air grid 28, 30 via the support arrangement 16 to the bearing structure 15. The bearing structure 15 is preferably formed at least partially, in particular completely, by the housing 2. As shown in the embodiment according to FIGS. 1 to 6, the bearing structure 15 is formed by the spiral housing 58, which is part of the housing 2.

In FIG. 7, the support arrangement 16 is fixedly connected to the bearing structure 15. Particularly preferably, the support arrangement 16 is part of the bearing structure 15, that is, is at least partially formed in one piece with the bearing structure 15. In this preferred embodiment, the support arrangement 16 is formed separately from the cooling air grid 28, 30.

In an alternative embodiment according to FIG. 8, it is provided that the support arrangement 16 is fixedly connected to the cooling air grid 28, 30. Particularly preferably, the support arrangement 16 and the cooling air grid 28, 30 are formed in one piece. In this embodiment, the cooling air grid 28, 30 and the support arrangement 16 would be formed decoupled, in particular separately, from the bearing structure 15.

FIG. 9 shows the cooling air grid 28, 30 according to FIG. 7 in a loaded state. The force Facts on an outer side 37 of the cooling air grid 28, 30. In this case, the cooling air grid 28, 30 is deformed and undergoes a deflection v. The cooling air grid 28, 30 has an inner side 38 facing the cooling air channel 10. The inner side 38 comes to bear against the support arrangement 16 because of the deflection of the cooling air grid 28, 30. As already described above, the support arrangement 16, in particular the support wall 17, has a contact surface 18, which is provided for contact with the inner side 38 of the cooling air grid 28, 30. The distance a between the inner side 38 of the cooling air grid 28, 30 and the contact surface 18 of the support arrangement 16 is to be selected such that, under the deflection v, the cooling air grid 28, 30 is merely elastically deformed. Plastic deformation and deformation leading to elongation at break should be excluded. Similarly, the distance a between the support arrangement 16 and the bearing structure 15 according to the embodiment as per FIG. 8 should be selected.

The distance a should be selected in particular with respect to the component to be deformed, here the cooling air grid 28, 30, depending on the geometric configuration and the material properties. Preferably, however, the distance a is less than 3 mm, in particular less than 2 mm, preferably less than 1.5 mm, particularly preferably less than 1.0 mm. It may also be provided that the support arrangement and the cooling air grid 28, 30 are at least partially, preferably completely, in contact in an unloaded state. Accordingly, no distance between the support arrangement and the cooling air grid 28, 30 would be provided. In such an embodiment, the support arrangement 16 and cooling air grid 28, 30 are formed movably with respect to each other. Particularly preferably, the distance a between the support arrangement 16 and the cooling air grid 28, 30 is at least 0.25 mm, in particular at least 0.5 mm.

If the cooling air grid 28, 30 is deformed by the deflection v such that the cooling air grid 28, 30 comes to bear with its inner side 38 against the support arrangement 16, the support arrangement 16 counteracts the force F. The force F is dissipated via the support arrangement 16 into the bearing structure 15. A further deflection of the cooling air grid 28, 30 is prevented. Plastic deformation and elongation at break of the cooling air grid 28, 30 can be excluded.

In a further embodiment according to the disclosure of the work apparatus 1, it can be provided that an elastic element is provided between the support arrangement 16, in particular the support wall 17, and the cooling air grid 28, 30. Such an elastic element may be formed, for example, from an elastomer material. Via such an elastic element, in the event of a load, energy can be additionally dissipated or shock loadings between the cooling air grid and the support arrangement 16 avoided.

FIG. 5 shows, in a further, perspective illustration, the work apparatus according to the disclosure as per FIG. 1. In FIG. 6, a partial side view of the work apparatus 1 is also shown. As shown in both FIGS. 5 and 6, the second part 60 of the spiral housing 58 is arranged, in particular fastened, on the first part 59 of the spiral housing 58. The support arrangement 16 is formed in one piece with the first part 59 of the spiral housing 58. In addition, the support arrangement 16, in particular via its second longitudinal side 23, is held on the second part 60 of the spiral housing 58. For this purpose, at least one tab 24, preferably a plurality of tabs, in particular three tabs, is or are provided on the second longitudinal side 23 of the support arrangement 16. A plurality of tabs 24 are spaced apart from one another on the second longitudinal side 23 of the support arrangement 16 (FIG. 4). The at least one tab 24 engages in a holding contour 25 formed on the second part 60 of the spiral housing 58. The holding contour 25 is configured as a closed bulge in which the tab 24 engages. The holding contour 25 may also be configured as an open eyelet. Other embodiments of the holding contour 25 may also be expedient. The number of holding contours 25 naturally corresponds to the number of tabs 24.

FIGS. 10 to 14 show a further embodiment according to the disclosure of the work apparatus 1 as a chain saw. The same reference signs identify the same components. The tool 5 of the work apparatus 1 is configured as a saw chain, which is only schematically indicated. The saw chain is driven in a manner revolving around a guide bar by the drive motor 3.

The work apparatus 1 also has, on its first longitudinal side 46, a channel inlet 26 with a first cooling air grid 30 and, on its bottom side 45, a channel outlet 27 with a second cooling air grid 28. A cooling air flow 11 is generated via the fan wheel 56 shown in FIG. 11, the cooling air flow flowing from the channel inlet 26 through the cooling air channel 10 to the channel outlet 27. The support arrangement 16, in particular the rib-like support wall 17, is provided in the end region of the cooling air channel 10, in particular in the diffuser 61.

Figure 11:
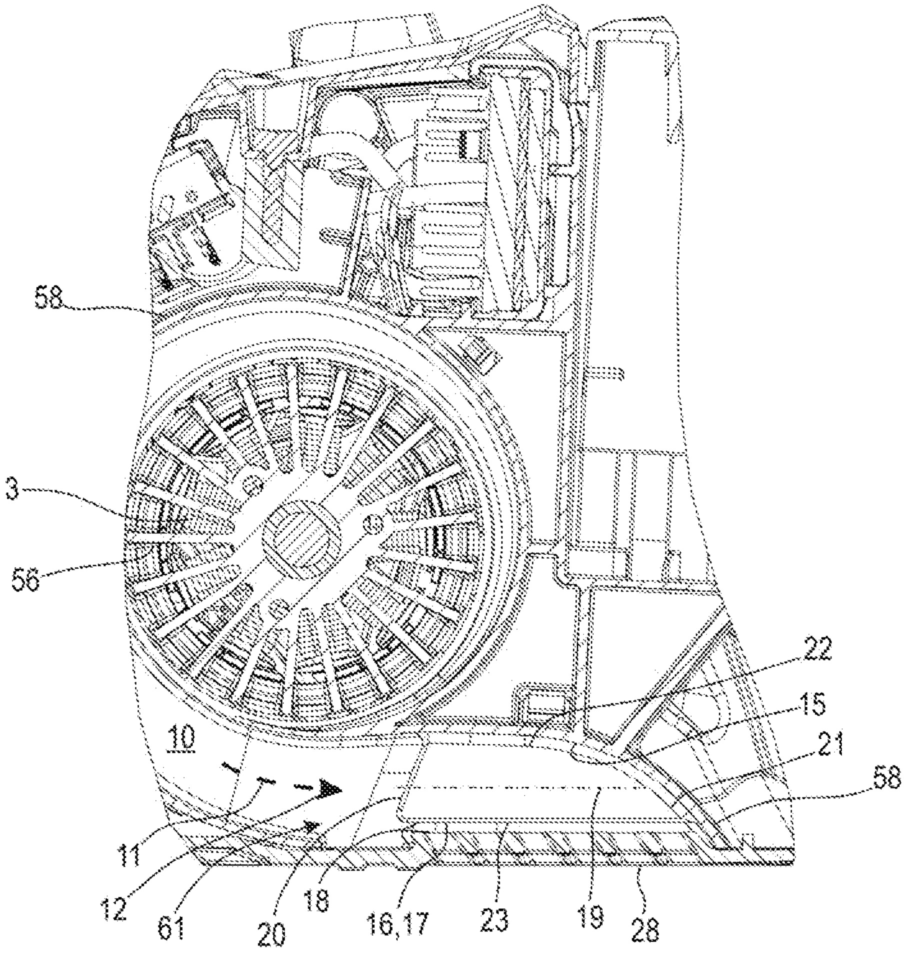
FIG. 11 shows in a partial sectional illustration, the channel outlet with the support arrangement of the work apparatus according to FIG. 10.
Figure 12:
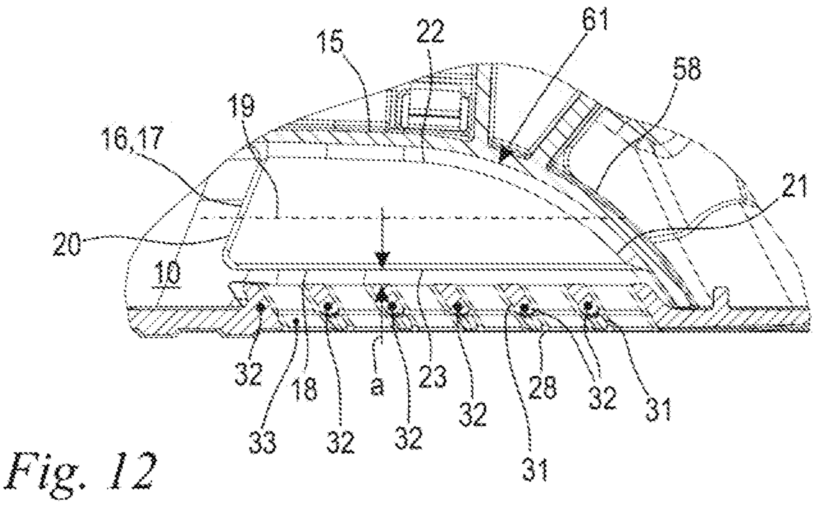
FIG. 12 shows, in an enlarged illustration, the support arrangement according to FIG.

As shown in FIGS. 11 and 12, the support arrangement 16 differs from the support arrangement from the embodiment according to FIGS. 1 to 6 in that the contact surface 18 is formed on the second, here the lower, longitudinal side 23. The support wall 17 is fixedly connected to the bearing structure 15 via the first, here the upper, longitudinal side 22. The support wall 17 is thus fastened to the channel inner side of the cooling air channel 10. In the embodiment, the support wall 17 is formed in one piece with the bearing structure 15. The bearing structure 15 is formed by the spiral housing 58. The first longitudinal end 20 of the support wall 17 is a free end. The second longitudinal end 21 of the support wall 17, which is formed downstream of the first longitudinal end 20 with respect to the cooling air flow 11, is also fixedly connected to the bearing structure 15. The second longitudinal side 23 is configured as a free longitudinal side. In the embodiment, the contact surface 18 is formed over the entire second longitudinal side 23. The rib-like support wall 17 is also flat.

As shown in FIGS. 11 and 12, the longitudinal center axis 19 of the support wall 17 extends transversely to the grid ribs 31, in particular transversely to the longitudinal center axes 32 of the individual grid ribs 31. In the viewing direction perpendicularly from below onto the cooling air grid 28, the individual grid ribs 31 are oriented perpendicularly to the contact surface 18 of the support wall 17. In this viewing direction, the individual grid ribs 31, in particular their longitudinal center axis 32, enclose an angle with the longitudinal center axis 19 of the support wall 17. This angle is preferably between 45° and 90°, especially between 80° and 90°. The contact surface 18 extends with respect to the direction of the longitudinal center axis 19 of the support wall 17 over a plurality of grid ribs 31, in particular over all of the grid ribs 31. If the cooling air grid 28 is deformed against the support wall 17, a plurality of grid ribs 31, in particular all of the grid ribs 31, can come to bear against the contact surface 18 of the support wall 17. A further difference in respect to the arrangement of the support wall 17 and cooling air grid 28 compared to the embodiment according to FIGS. 1 to 6 is that the distance a of all of the grid ribs 31 in relation to the contact surface 18 of the support wall 17 is constant in the unloaded state of the cooling air grid 28.

Figure 13:
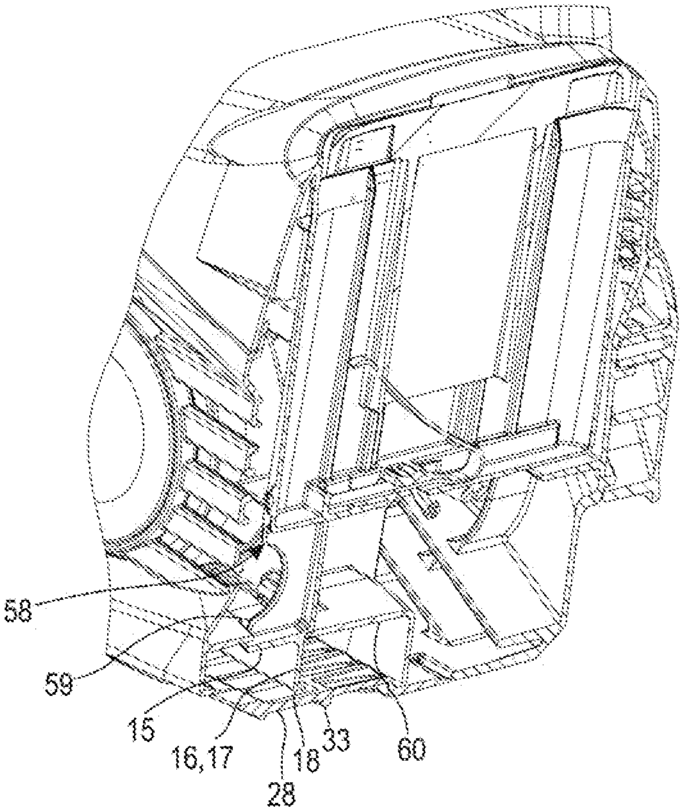
FIG. 13 shows, in a partial perspective illustration, the support arrangement in the spiral housing of the work apparatus according to FIG. 10.
Figure 14:
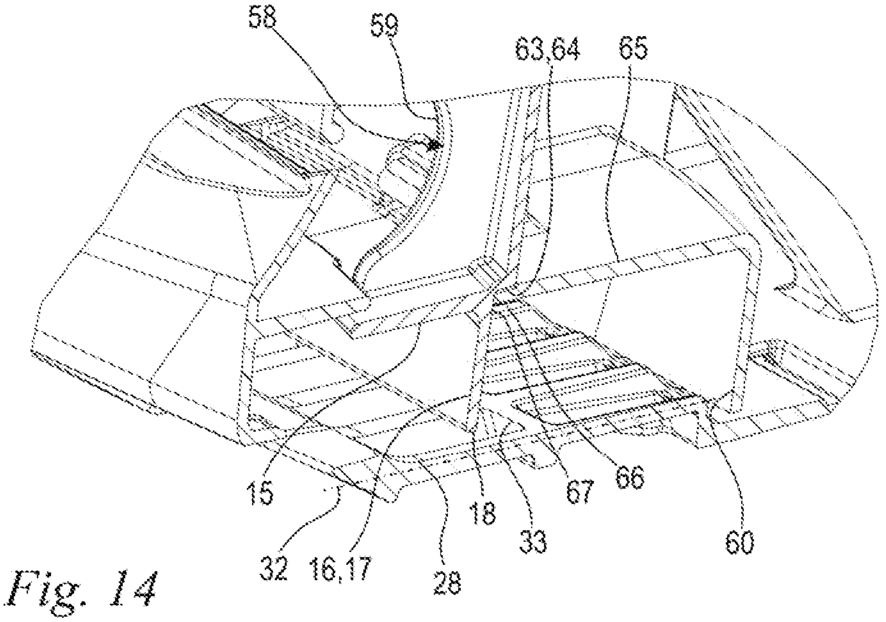
FIG. 14 shows an enlarged illustration of the support arrangement according to FIG. 13.

In FIGS. 13 and 14, the formation of the connecting web 33 of the cooling air grid 28 can be seen in particular. The connecting web 33 is arranged laterally offset to the support wall 17 in the viewing direction perpendicularly from below onto the cooling air grid 28. Nevertheless, the contact surface 18 of the support wall 17 and the connecting web 33 are oriented parallel to each other. In the embodiment, the connecting web 33 runs centrally through the cooling air grid 28. In the event of deformation of the cooling air grid 28, the contact surface 18 comes to bear against the cooling air grid 28 eccentrically to the cooling air grid 28. Owing to the small distance between the connecting web 33 and the contact surface 18 of the support wall 17, force is transmitted fairly homogeneously from the cooling air grid 28 to the support wall 17 when the cooling air grid 28 is correspondingly deformed.

As shown in FIGS. 13 and 14, the support wall 17 is formed in one piece with the spiral housing 58, in particular with a first part 59 of the spiral housing 58. The spiral housing 58, in particular the first part 59 of the spiral housing 58, is fastened to a second part 60 of the spiral housing 58 of the work apparatus 1. The drive motor 3 is arranged in the second part 60. A shoulder 63 is formed adjacent to the first longitudinal side 22 of the support wall 17, on the first part 59 of the spiral housing 58 on the side facing the second part 60 of the spiral housing 58. The shoulder 63 has a supporting surface 64 which is oriented approximately parallel to the inner side 38 of the cooling air grid 28. The second part 60 of the spiral housing 58 has a flat cantilever arm 65. The flat cantilever arm 65 engages under the shoulder 63, as a result of which the first part 59 of the spiral housing 58 is supported in the region of the support wall 17 by the second part 60 of the spiral housing 58. The cantilever arm 65 acts with its free end 66 against the supporting surface 64 and thereby supports the first part 59 of the spiral housing 58 in the region of the support wall 17. Furthermore, the first part 59 of the spiral housing 58 has an inner surface 67, which merges fluently into the support wall 17. The inner surface 67 faces the second part 60 of the spiral housing 58. The inner surface 67 has a vertical orientation to the longitudinal center axes 32 of the grid ribs 31. The free end 66 of the cantilever arm 65 also acts on the inner surface 67 of the first part 59 of the spiral housing 58, as a result of which it is also supported against displacement in the direction of the second part 60 of the spiral housing 58. If the cooling air grid 28 is deformed in such a way that it comes to bear against the support wall 17, the forces are transmitted into the first part 59 of the spiral housing 58 and to some extent also into the second part 60 of the spiral housing 58.

FIGS. 15 to 18 show a further embodiment according to the disclosure of the work apparatus 1 as a wood cutter. The same reference signs identify the same components. The tool 5 of the work apparatus 1 is configured as a saw chain, which is only schematically indicated. The saw chain is driven in a manner revolving around a guide bar by the drive motor 3.

The work apparatus 1, which is in the form of a wood cutter, has a channel inlet 26 with a first cooling air grid 30 on its first longitudinal side 46. In the present embodiment of the work apparatus, a further channel inlet, not illustrated specifically, with a further first cooling air grid is also provided on the second longitudinal side 47. Furthermore, the work apparatus 1 has a channel outlet 27 with a second cooling air grid 28 on its first longitudinal side 46. The work apparatus also has a further channel outlet 27' with a further second cooling air grid 28' on its second longitudinal side 47 (FIG. 18).

Figure 17:
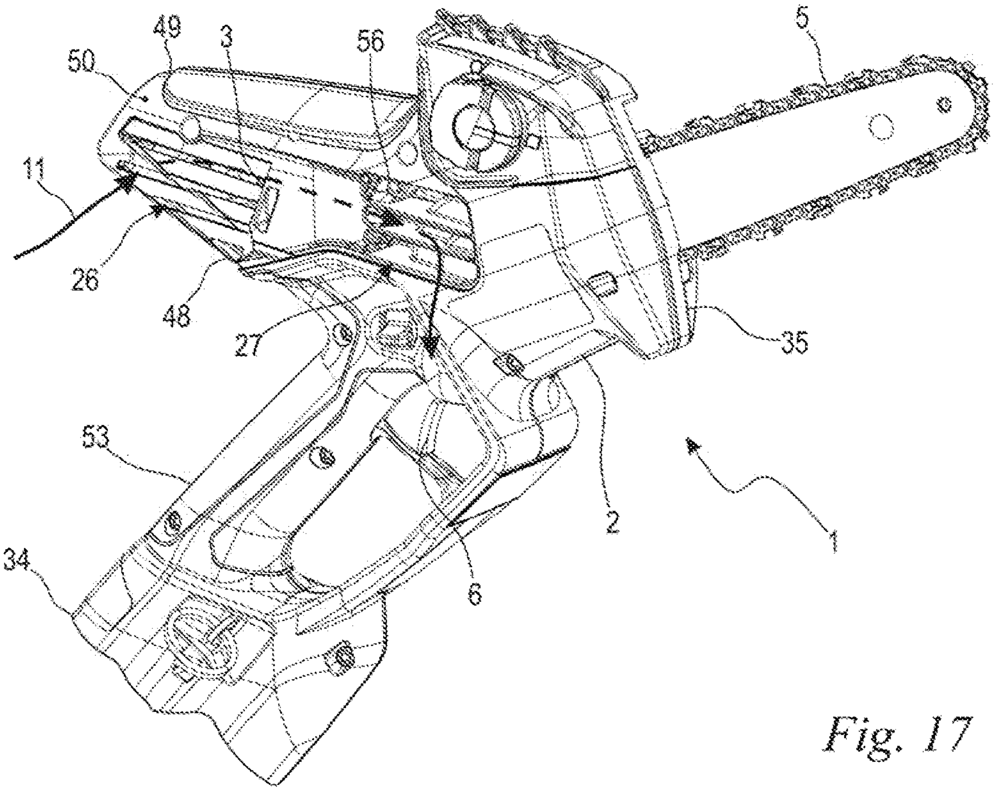
FIG. 17 shows, in a perspective illustration, the wood cutter according to FIG. 15 without a cooling air grid; and, FIG. 18 shows, in a partial, enlarged sectional illustration, the support arrangement of the wood cutter according to FIG. 15.

FIG. 17 shows the fan wheel 56 which generates the cooling air flow 11. The cooling air flow 11 flows from the channel inlet 26 through the cooling air channel 10 to the channel outlet 27. The cooling air channel 10 extends substantially along the drive motor 3. The support arrangement 16 is provided in the end region of the cooling air channel 10 toward the channel outlet 27. A further support arrangement 16' is provided in the end region of the cooling air channel 10 toward the further channel outlet 27'. The support arrangements 16, 16' each have the at least one rib-like support wall 17, 17'. In the present, preferred embodiment, the support arrangements 16, 16' each have two rib-like support walls 17, 17'. In an alternative embodiment, it may also be provided that each support arrangement 16, 16' has three or more support walls 17, 17'.

As shown in FIGS. 15 to 18, the rib-like support walls 17, 17' are formed parallel to the grid ribs 31 of the second cooling air grid 28, 28'. As shown in particular in FIG. 18, the rib-like support walls 17, 17' are at the distance a to the adjacent grid ribs 31 of the second cooling air grid 28, 28'. There is no contact between the rib-like support walls 17, 17' and the grid rib 31 assigned to a respective support wall 17, 17'.

Figure 18:
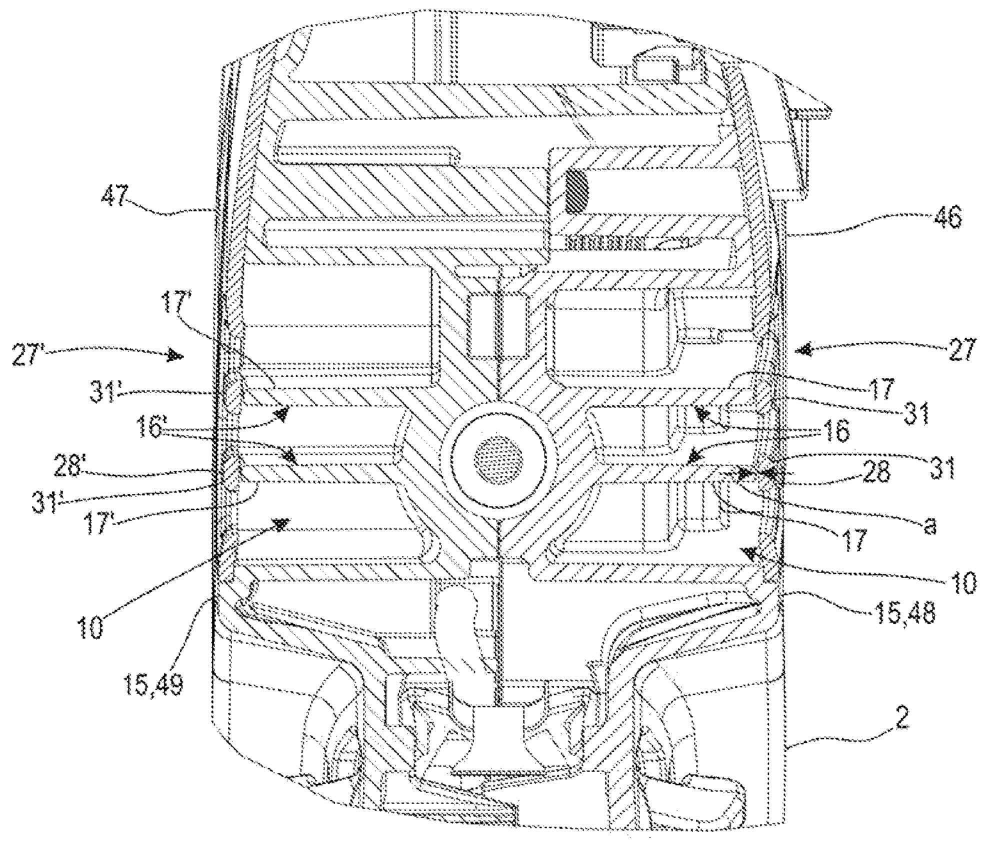

As shown in FIG. 18, the support wall 17, 17' is formed in one piece with the bearing structure 15, which is part of the housing 2. In the embodiment of the wood cutter, the housing 2 is formed from two housing shells 48, 49, the first housing shell 48 being connected to the second housing shell 49. The two housing shells 48, 49 are separated along a longitudinal plane which extends approximately parallel to the tool plane. A support arrangement 16, 16' is formed on each housing shell 48, 49.

As shown in FIG. 17, the channel inlet 26 and the channel outlet 27 are formed on the first housing shell 48. The further channel inlet 26' and the further channel outlet 27' are formed on the second housing shell 49.

Figure 15:
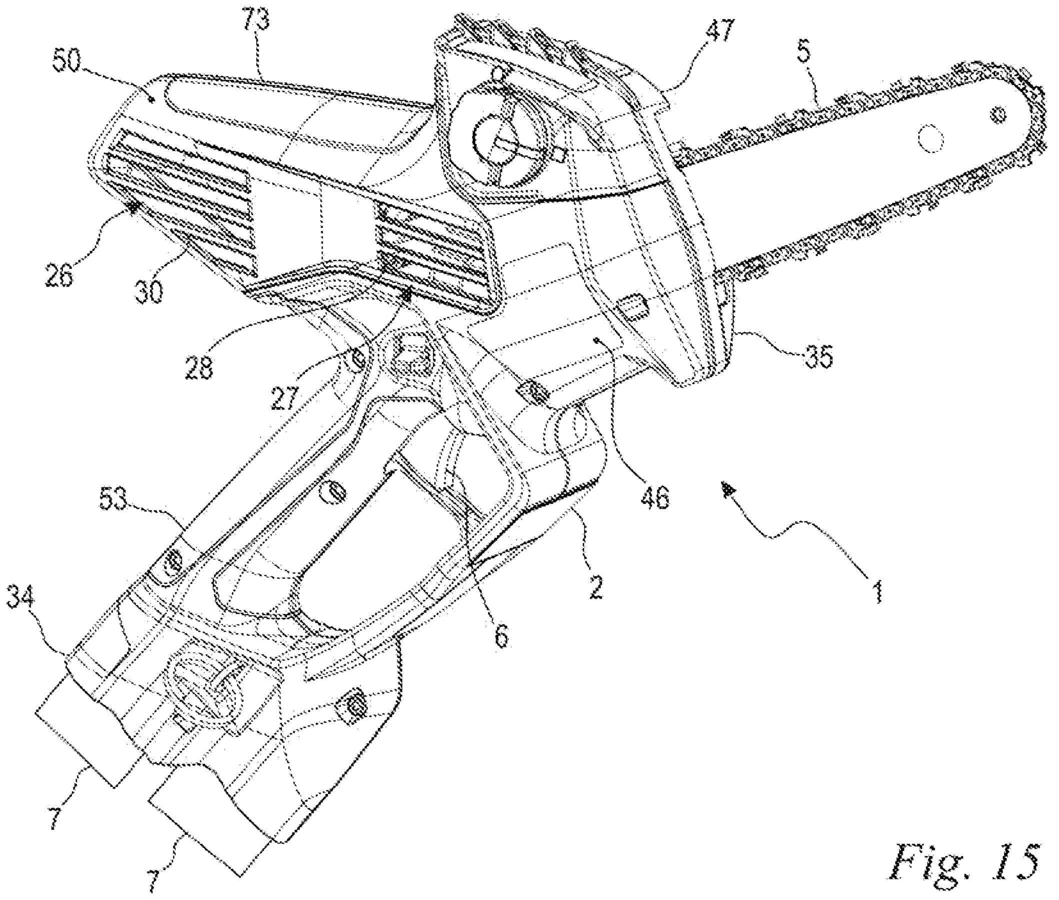
FIG. 15 shows, in a perspective illustration, a further embodiment according to the disclosure of the electrical work apparatus as a wood cutter.
Figure 16:
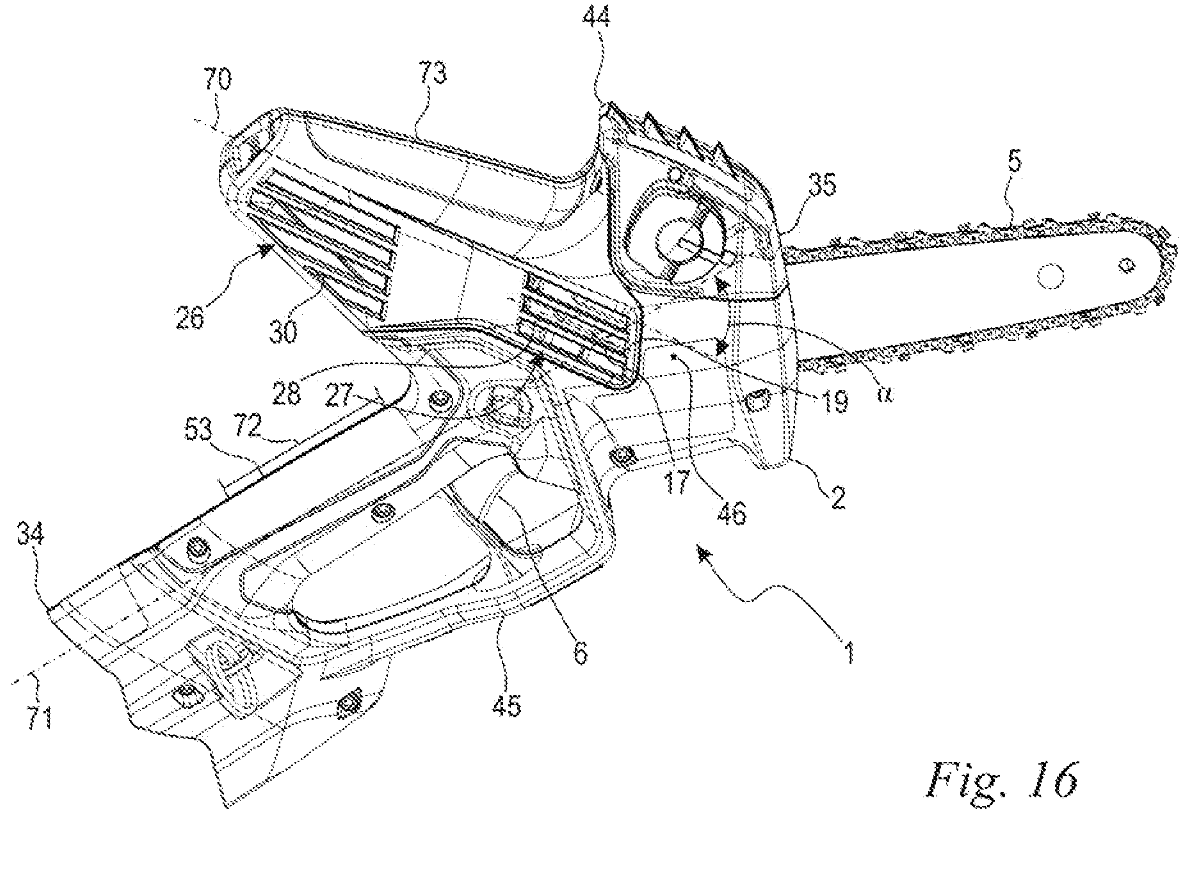
FIG. 16 shows, in a side view, the wood cutter according to FIG. 1.

As shown in FIG. 17, the work apparatus 1 includes a handle 53. The operator controlled element 6 for controlling the drive motor 3 is assigned to the handle 53. In addition, the work apparatus 1 includes a further handle 73. The further handle 73 is used to support the operator's other hand. As shown in FIGS. 15 and 16, a handle housing 50 which forms a part of the further handle 73 is provided. In FIG. 17, the handle housing 50 has been removed. The handle housing 50 engages at least partially around the first housing shell 48 and the second housing shell 49. As shown in FIGS. 15 and 16, both the first cooling air grid 30 and the second cooling air grid 28 are formed on the handle housing 50. In the present case, the first cooling air grid 30, which engages over the channel inlet 26, the second cooling air grid 28, which engages over the channel outlet 27, a further first cooling air grid, which engages over the further channel inlet 26', and a further second cooling air grid, which engages over the further channel outlet 27', are formed on the handle housing 50. All of the cooling air grids are formed integrally with the handle housing 50.

In FIG. 16, the rotational axis 70 of the drive motor 3, which is concealed by the housing 2, is shown schematically by a chain-dotted line. The drive shaft of the drive motor 3 rotates around the rotational axis 70. Furthermore, the handle 53 has a longitudinal center axis 71. The longitudinal center axis 71 refers to a handle section 72 of the handle 53, in which the handle 53 can be gripped by an operator's hand. The rib-like support walls 17, 17' run with their longitudinal center axis 19 preferably parallel to the rotational axis 70 of the drive motor 3. Preferably, the longitudinal center axis 19 of the rib-like support wall 17 and the longitudinal center axis 71 of the handle 53 enclose an angle $\alpha$ in a viewing direction perpendicular to the tool plane, wherein the angle $\alpha$ is open toward the tool 5 and is in a range of between 100° to 40°, in particular between 85° to 55°, especially at approximately 68°.

It is understood that the foregoing description is that of the preferred embodiments of the invention and that various changes and modifications may be made thereto without departing from the spirit and scope of the invention as defined in the appended claims.

The invention claimed is:

1. A handheld work apparatus comprising:

a housing;

a drive motor arranged in said housing and configured to drive a tool of the work apparatus;

a cooling air channel formed in said housing for guiding a cooling air flow;

said cooling air channel having at least one channel inlet and at least one channel outlet;

at least one cooling air grid arranged at least at one of said channel inlet and said channel outlet;

said housing having a bearing structure;

said bearing structure being a separate component in relation to said at least one cooling air grid;

a support arrangement arranged between said cooling air grid and said bearing structure, said support arrangement being provided in said cooling air channel;

said cooling air grid and said support arrangement being configured and arranged with respect to each other such that a force acting on said cooling air grid is transmittable from said cooling air grid via said support arrangement to said bearing structure;

said support arrangement and said cooling air grid being spaced apart from each other in an unloaded state of said cooling air grid; and, wherein said cooling air grid and said support arrangement are configured and arranged with respect to each other such that, during a transmission of the force, which causes said cooling air grid to deform until said cooling air grid bears against said support arrangement, said cooling air grid is only elastically deformed, wherein said cooling air grid is an integral part of said housing.

2. The work apparatus of claim 1, wherein said support arrangement is at least partially fixedly connected to said bearing structure.

3. The work apparatus of claim 2, wherein said support arrangement is at least partially formed in one piece with said bearing structure.

4. The work apparatus of claim 1, wherein said support arrangement is a separate component with respect to said cooling air grid.

5. The work apparatus of claim 1, wherein said support arrangement is movable relative to said cooling air grid.

6. The work apparatus of claim 1, wherein a distance between said support arrangement and said cooling air grid is not more than 3 mm.

7. The work apparatus of claim 1, wherein said support arrangement is formed from at least one rib-like support wall, said at least one rib-like support wall having a contact surface via which the force acting on said cooling air grid is transmittable directly from said cooling air grid to said support wall.

8. The work apparatus of claim 7, wherein said cooling air grid has a plurality of grid ribs, said contact surface of said support wall extending transversely to said grid ribs along the plurality of said grid ribs.

9. The work apparatus of claim 8, wherein said support wall is configured such that distances between said contact surface of said support wall and individual ones of said grid ribs are identical in size.

10. The work apparatus of claim 7, wherein said support wall is arranged in said cooling air channel such that a direction of a longitudinal center axis of said support wall corresponds to a flow direction of the cooling air flow.

11. The work apparatus of claim 1, wherein said cooling air grid is arranged at a bottom side of said housing so that when the work apparatus is placed on a ground at least a portion of a weight of the work apparatus is supported on said bearing structure via said cooling air grid and said support arrangement.

12. The work apparatus of claim 11, wherein:

a spacing, a geometry and material properties of said cooling air grid are selected such that, when subjected to a load caused by the weight of the work apparatus placed on the ground, said cooling air grid is only elastically deformed until said cooling air grid comes into contact with said support arrangement.

13. The work apparatus of claim 11, wherein:

said cooling air grid has a plurality of grid ribs that are parallel to each other and at least one connecting web interconnecting said plurality of grid ribs; and, said support arrangement is formed from at least one rib-like support wall having a contact surface; and, said contact surface of said at least one rib-like support wall extending transversely to said plurality of grid ribs along said at least one connecting web so that in a deformed state of said cooling air grid forces of several grid ribs are transferable via said connecting web to said at least one rib-like support wall.

14. The work apparatus of claim 7, wherein:

said cooling air grid has a plurality of grid ribs; and, in the unloaded state of said cooling air grid, a plurality of distances between said contact surface of said at least one rib-like support wall and individual ones of said plurality of grid ribs are equal, so that in the loaded state of said cooling air grid a homogeneous force transmission from said cooling air grid to said at least one rib-like support wall takes place.

* * * * *